(12) United States Patent
Borges et al.

(10) Patent No.: US 8,528,920 B2
(45) Date of Patent: Sep. 10, 2013

(54) ADJUSTMENT ASSEMBLY

(75) Inventors: Gustavo Vieira Borges, Whitehouse, OH (US); Robert J. Brazeau, Kalamazoo, MI (US); Christopher J. Wittry, Georgetown, KY (US); Michael D. Lynch, Attica, MI (US); Michael A. Power, Millbrook, AL (US); Gregory Todd Smith, Mason, OH (US); Kenneth G. Lang, Davison, MI (US); Anthony E. Nicol, Aurora (CA); Gregory D. Pavuk, Berkley, MI (US); Edward J. Gebal, Troy, MI (US); Thomas S. Mijal, Macomb Township, MI (US); Esequiel Berra de Mello, Troy, MI (US); Christopher S. Keeney, Troy, MI (US); David G. Gonska, Beverly Hills, MI (US)

(73) Assignee: Arvinmeritor Technology, LLC, Troy, MI (US)

( * ) Notice: Subject to any disclaimer, the term of this patent is extended or adjusted under 35 U.S.C. 154(b) by 262 days.

(21) Appl. No.: 13/037,423

(22) Filed: Mar. 1, 2011

(65) Prior Publication Data
US 2012/0223498 A1 Sep. 6, 2012

(51) Int. Cl.
*B62D 17/00* (2006.01)

(52) U.S. Cl.
USPC .......... 280/86.75; 280/124.128; 280/124.153; 403/321

(58) Field of Classification Search
USPC ............. 280/86.75, 86.753, 86.754, 76.755, 280/86.757, 86.758, 86.751, 124.116, 124.152, 280/124.153, 124.128; 403/321, 322.1, 322.4; 411/398

See application file for complete search history.

(56) References Cited

U.S. PATENT DOCUMENTS

| | | | | |
|---|---|---|---|---|
| 2,616,713 A * | 11/1952 | Schofield | .................... | 280/6.151 |
| 3,516,644 A * | 6/1970 | Horgan, Jr. | ..................... | 256/68 |
| 5,129,669 A * | 7/1992 | Specktor et al. | .......... | 280/86.753 |
| 5,463,912 A * | 11/1995 | Inoue et al. | ..................... | 74/519 |
| 6,293,570 B1 * | 9/2001 | Gottschalk et al. | ...... | 280/86.751 |
| 6,446,746 B1 | 9/2002 | Bell et al. | | |
| 6,565,073 B1 | 5/2003 | Carlstedt et al. | | |
| 6,571,903 B2 | 6/2003 | Brissette et al. | | |
| 6,619,673 B2 * | 9/2003 | Eckelberry et al. | ........ | 280/6.151 |
| 6,659,479 B1 * | 12/2003 | Raidel et al. | ............... | 280/86.75 |
| 6,659,482 B2 | 12/2003 | Carlstedt et al. | | |
| 6,676,145 B2 | 1/2004 | Carlstedt | | |

(Continued)

FOREIGN PATENT DOCUMENTS

GB 2123927 A * 2/1984

OTHER PUBLICATIONS

U.S. Appl. No. 12/568,691, filed Sep. 29, 2009.

*Primary Examiner* — Faye M Fleming
*Assistant Examiner* — James English
(74) *Attorney, Agent, or Firm* — Brooks Kushman P.C.

(57) ABSTRACT

An adjustment assembly includes first and second connection points associated with a component. The second connection point is selectively adjustable to adjust a position of the component. A shield has one end coupled to the first connection point and an opposite end proximate to the second connection point to selectively prevent access to the second connection point. The shield is selectively movable when the first connection point is loosened to allow access to the second connection point. To achieve proper adjustment of the component, the first connection point must be loosened prior to adjusting a position of the second connection point.

13 Claims, 2 Drawing Sheets

(56) References Cited

U.S. PATENT DOCUMENTS

| | | |
|---|---|---|
| 6,722,677 B2 | 4/2004 | Carlstedt |
| 6,726,229 B2 | 4/2004 | Smith et al. |
| 6,767,157 B2 * | 7/2004 | Gilliland et al. ............ 403/374.1 |
| 6,786,509 B2 | 9/2004 | Lang et al. |
| 6,793,035 B2 | 9/2004 | Bennett et al. |
| 6,820,883 B2 | 11/2004 | Lang et al. |
| 7,175,220 B2 * | 2/2007 | Kashiwagi et al. ......... 296/65.03 |
| 7,210,692 B2 * | 5/2007 | Galazin ...................... 280/86.75 |
| 7,229,094 B2 | 6/2007 | Miller et al. |
| 7,296,809 B2 * | 11/2007 | Zebolsky .................... 280/86.75 |
| 7,621,689 B2 * | 11/2009 | Nishioka et al. ............ 403/322.1 |
| 8,267,613 B2 * | 9/2012 | Lindloff ..................... 403/322.4 |
| 2002/0180170 A1 * | 12/2002 | Anderson .............. 280/124.128 |
| 2003/0132626 A1 | 7/2003 | Carlstedt et al. |
| 2003/0184038 A1 | 10/2003 | Smith et al. |
| 2005/0023792 A1 | 2/2005 | Miller et al. |
| 2005/0156398 A1 * | 7/2005 | Ramsey ................. 280/124.116 |
| 2005/0253351 A1 | 11/2005 | Pan et al. |
| 2005/0263986 A1 | 12/2005 | Miller et al. |
| 2005/0269795 A1 | 12/2005 | McKenzie et al. |
| 2006/0208447 A1 | 9/2006 | Eshelman et al. |
| 2007/0158925 A1 | 7/2007 | Fader et al. |
| 2008/0224428 A1 | 9/2008 | Smith et al. |
| 2012/0104713 A1 * | 5/2012 | Frens ......................... 280/86.75 |
| 2012/0153589 A1 * | 6/2012 | McCarthy et al. ......... 280/86.75 |

\* cited by examiner

ADJUSTMENT ASSEMBLY

TECHNICAL FIELD

This invention generally relates to an adjustment assembly for a component that includes first and second connection points with a position of at least the second connection point being selectively adjustable when the first connection point is loosened to adjust a position of the component to a desired position.

BACKGROUND OF THE INVENTION

One example of an adjustment assembly includes first and second connection points that are spaced apart from each other. The first and second connection points connect to a common component assembly. When adjusting a position of the component assembly to achieve a desired position, certain portions of the component assembly can be bound up or preloaded in such a manner that fatigue life can be adversely affected.

SUMMARY OF THE INVENTION

An adjustment assembly includes first and second connection points that are associated with a component and are spaced apart from each other. The second connection point is selectively adjustable when the first connection point is loosened to adjust a position of the component to a desired position.

In one example, a shield has one end coupled to the first connection point and an opposite end proximate to the second connection point to selectively prevent access to the second connection point. The shield is selectively movable when the first connection point is loosened to allow access to the second connection point. To achieve proper adjustment of the component, the first connection point must be loosened prior to adjusting a position of the second connection point.

In one example, the first connection point comprises a fastener received within a slot.

In another example, the second connection point comprises a fastener received within a slot.

In another example, each of the first and second connection points comprise a fastener received within a slot.

In one example, the assembly includes a feature associated with the second connection point that allows movement of the second connection point when the first connection point is loosened to achieve a desired position for the component.

In one example, the first and second connection points are connected to a common member to attach to the component. The component can be any type of component and in one example the component comprises a linkage assembly including at least a first link member and a second link member. The first connection point comprises a connection between the first link member and the common member and the second connection point comprises a connection between the second link member and the common member.

The linkage assembly can comprise any type of linkage assembly, and in one example, the linkage assembly comprises a suspension linkage including at least upper and lower control arm link members.

These and other features of the present invention can be best understood from the following specification and drawings, the following of which is a brief description.

DETAILED DESCRIPTION OF THE PREFERRED EMBODIMENT

Figure 1:
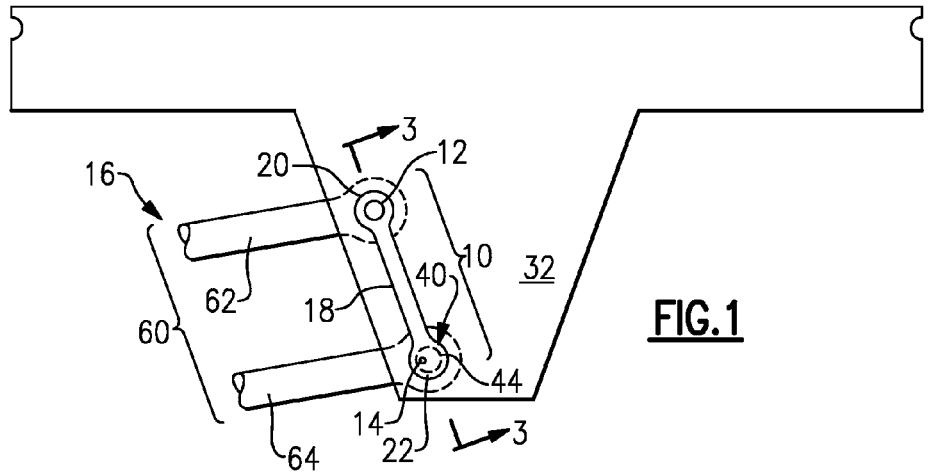
FIG. 1 is a schematic side view of one example of an adjustment assembly with a shield.

An adjustment assembly 10 includes a first connection point 12 and a second connection point 14 each associated with a component 16. The second connection point 14 is spaced from the first connection point 12 and is selectively adjustable to adjust a position of the component 16 to achieve a desired position. The component 16 can be a single member or can be comprised of a plurality of members that are assembled together to form the component. One example of such a component comprises a vehicle suspension which will be discussed in greater detail below; however, it should be understood that the adjustment assembly 10 could be used to adjust any type of component with two connection points as described herein.

The adjustment assembly 10 also includes a shield 18 having a first end 20 coupled to the first connection point 12 and a second end 22 proximate to the second connection point 14 to selectively prevent access to the second connection point 14. The shield 18 is selectively movable when the first connection point 12 is loosened to allow access to the second connection point 14. To achieve proper adjustment of the component 16 the first connection point 12 must be loosened prior to adjusting a position of the second connection point 14.

Figure 2A:
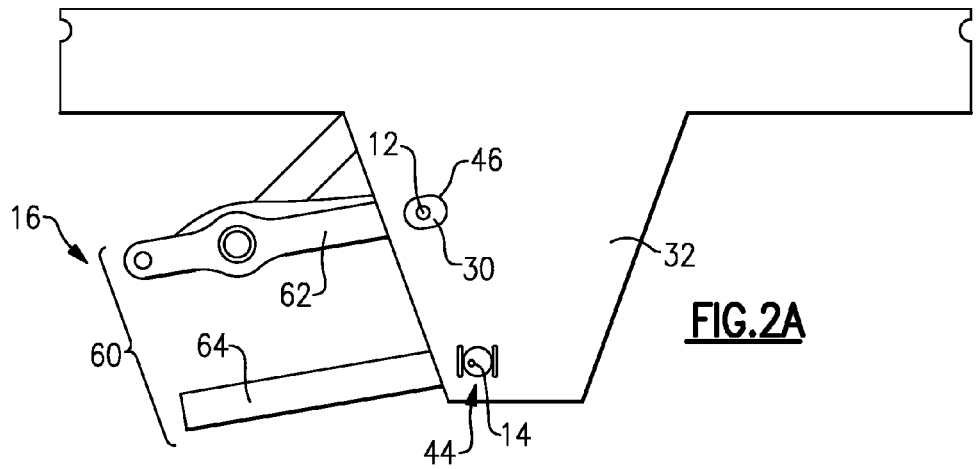
FIG. 2A is a schematic side view of one example of an adjustment assembly of FIG. 1 without the shield.
Figure 2B:
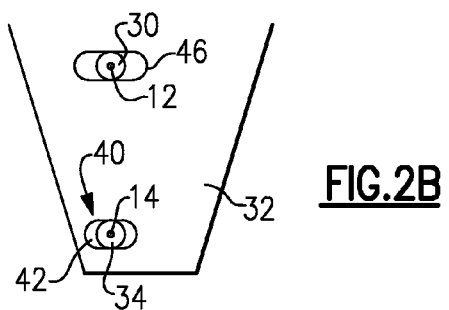
FIG. 2B is a schematic side view of another example of an adjustment assembly of FIG. 1 without the shield.
Figure 3:
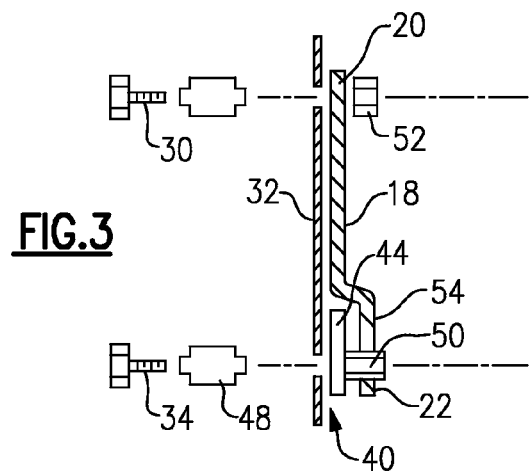
FIG. 3 is a cross-sectional view as taken along lines 3-3 of FIG. 1.

In one example, the first connection point 12 comprises a fastener 30 that secures the component 16 to a member 32 and the second connection point 14 comprises a fastener 34 that also secures the component 16 to the member 32 (most clearly shown in FIGS. 2A-2B and 3).

In one example, the adjustment assembly 10 includes a feature 40 associated with the second connection point 14 that allows movement of the second connection point 14 when the first connection point 12 is loosened to achieve a desired position for the component 16. In the example shown in FIG. 2B, the feature 40 comprises a slot 42 that receives the fastener 34, and in the example shown in FIGS. 1, 2A and 3 the feature comprises an eccentric collar 44 mounted at the second connection point 14.

Thus, FIGS. 2A and 3 show a configuration with a first fastener 30 received within a first slot 46 and a second fastener 34 coupled to an eccentric collar 44; while FIG. 2B shows a configuration with the first fastener 30 received within the first slot 46 and the second fastener 34 received within the second slot 42. The shield 18 is not shown in FIGS. 2A-2B for purposes of clarity; however, it should be understood that in each of these examples, the shield 18 has the first end 20 coupled to the first fastener 30 with the second end 22 being proximate with the second fastener 34. To adjust a position of the component 16, the first fastener 30 is loosened sufficiently to allow the second end 22 of the shield 18 to be moved away from the second connection point 14. This allows the position of the second connection point 14 to be adjusted via movement of the second fastener 34 within the slot 42, or via movement of the eccentric collar 44, until a desired position of the component 16 is achieved. Once the component 16 is in the desired position, the second end 22 of the shield is returned to its original position covering the second connection point 14, and the first fastener 30 is tightened.

The eccentric collar 44 is shown in greater detail in FIG. 3. The first 30 and second 34 fasteners are received within bushings 48 associated with the component 16, which are inserted through corresponding openings/slots within the member 32. A nut 52 is threaded onto an end of the first fastener 30 after insertion to secure the first end 20 of the shield 18 and the associated component 16 to the member 32. The eccentric collar 44 is fixed to the second end 22 of the shield 18 with the second fastener 34 and associated nut 50. The shield 18 includes a raised portion 54 that extends over the eccentric collar 44 to prevent access to the second connection point 14 when the first connection point 12 has not been loosened. To adjust a position of the component 16, the first fastener 30 is loosened allowing the second end 22 of the shield 18 to be moved to provide access to the second connection point and eccentric collar 44. The eccentric collar 44 is rotated/adjusted until the second connection point 14 is in the desired position. Then shield 18 is returned to its original position and the first fastener 30 is tightened.

It should be understood that while the feature 40 is shown as a slot 42 and eccentric collar 44, this is just one of many configurations the feature can take. Any type of feature that allows the second connection point 14 to be moved only after the first connection point 12 has been loosened can be utilized within the subject adjustment assembly 10. One advantage with using the feature 40 as a slot 42 is that an additional component, such as the eccentric collar 44 is not required, which reduces cost; however, the eccentric collar offers the advantage of facilitating movement in the slot.

Figure 4:
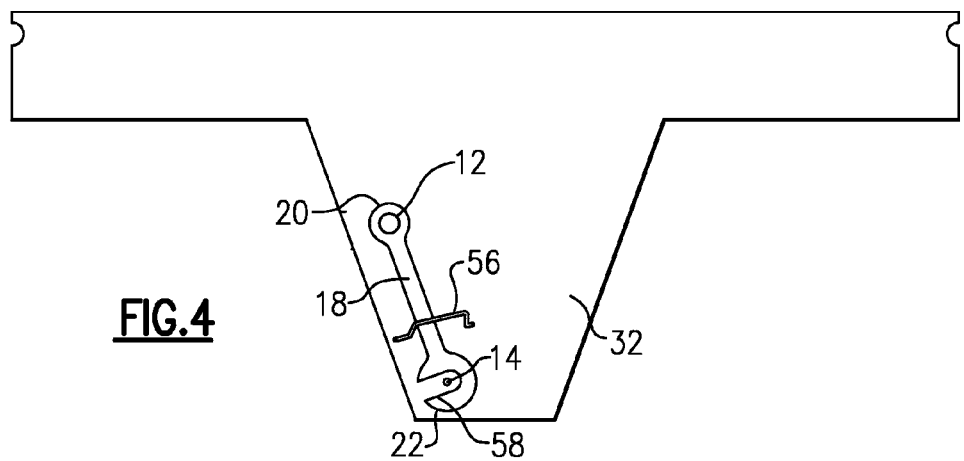
FIG. 4 is a schematic side view showing another example of a shield.

In another example shown in FIG. 4, the shield 18 has a limited range of movement such that the shield 18 cannot be removed/separated from the member 32. In the example shown, a strap 56 or other retaining member is secured/welded at each strap end to the member 32 and extends over a center portion of the shield 18. The strap 56 or retainer could also be attached using other methods. The second end 22 of the shield 18 includes a slot 58 that allows the second end 22 to be pivoted to allow access to the second connection point 14; however, the strap 56 limits the pivoting movement. It should be understood that the strap 56 is just one example of a feature that can be used to keep the shield from being removed from the member 32; and that any of various structures could also be used to accomplish this.

In one example, the component 16 comprises a linkage assembly 60 including at least a first link member 62 and a second link member 64. The first connection point 12 comprises a connection between the first link member 62 and the member 32 and the second connection point 14 comprises a connection between the second link member 64 and the member 32.

Figure 5:
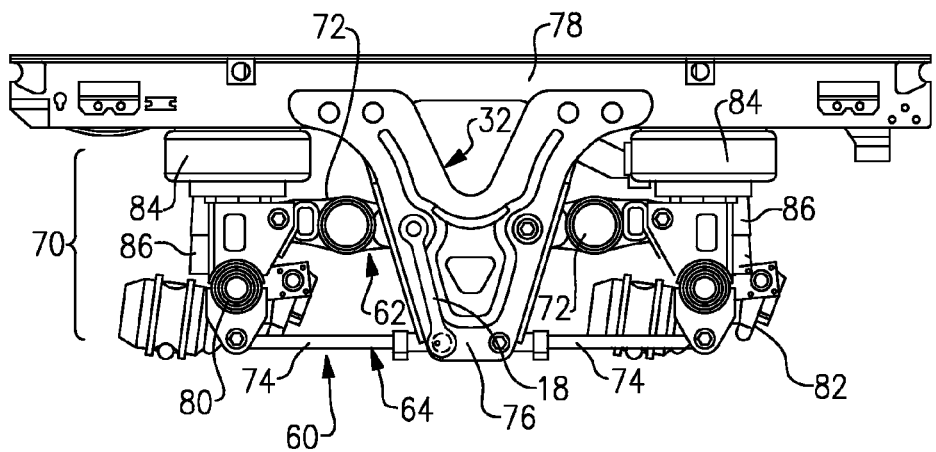
FIG. 5 is side view of one example of a component that can utilize the subject adjustment assembly.

In one example, the linkage assembly 60 is utilized within a vehicle suspension 70 as shown in FIG. 5. The first link member 62 comprises an upper control arm 72 and the second link member 64 comprises a lower control arm 74. In the example shown, the suspension 70 comprises a trailer suspension that allows a position of the suspension to be adjusted relative to a trailer pulled by a truck. The member 32 comprises a frame bracket 76 that is secured to a slider assembly 78.

Front 80 and rear 82 axle assemblies are coupled to the frame bracket 76 with upper control arms 72 and lower control arms 74. The lower control arm 74 comprises a fixed length torque rod. The front 80 and rear 82 axle assemblies are also supported relative to the slider assembly 78 via air springs 84 and shock absorbers 86.

To adjust a position of the suspension relative to the frame bracket 76, the first fastener 30 is loosened such that the shield 18 can be moved away from the second connection point 14. Then the eccentric collar 44 is rotated within the slot to adjust a position of the lower control arm, or the second fastener 34 is otherwise moved within the slot 42 to adjust a position of the lower control arm 74. Any associated movement initiated by the lower control arm 74 through the linkage assembly 60 to the upper control arm can be compensated for by movement of the first fastener 30 within the first slot. Once the linkage assembly 60 is in the desired position, the shield 18 is moved to cover the second connection point 14 and the first fastener 30 is tightened back into place.

Loosening the first connection point 12 prior to adjustment of the second connection point 14 prevents the suspension from binding up during adjustment. When the suspension binds up, the bushings can become preloaded resulting in a reduced service life. The use of the shield 18 as described above, requires that the first connection point 12 be loosened before any adjustment can take place. This prevents any potential for binding up the suspension during adjustment.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An adjustment assembly comprising:
a first connection point associated with a component;
a second connection point associated with said component and spaced from said first connection point, said second connection point being selectively adjustable to adjust a position of said component; and
a shield having a first end and a second end, said first end being coupled to said first connection point, and said second end being proximate to said second connection point to selectively prevent access to said second connection point, said shield being selectively movable when said first connection point is loosened to allow access to said second connection point, wherein to achieve proper adjustment of said component said first connection point must be loosened prior to adjusting a position of said second connection point,
wherein said first and said second connection points are connected to a common member to attach to the component and the component comprises a linkage assembly including at least a first link member and a second link member, wherein said first connection point comprises a connection between said first link member and said common member and said second connection point comprises a connection between said second link member and said common member.

2. The adjustment assembly according to claim 1 wherein said first connection point comprises a fastener received within a slot.

3. The adjustment assembly according to claim 1 wherein said second connection point comprises a fastener received within a slot.

4. The adjustment assembly according to claim 1 wherein said first connection point comprises a first fastener received within a first slot, and wherein said second connection point comprises a second fastener received within a second slot.

5. The adjustment assembly according to claim 1 wherein said linkage assembly comprises a suspension linkage with said first link member comprising an upper control arm and said second link member comprising a lower control arm.

6. The adjustment assembly according to claim 1 including a feature associated with said second connection point, said feature allowing movement of said second connection point when said first connection point is loosened to achieve a desired position for the component.

7. The adjustment assembly according to claim 6 wherein said feature comprises a slot.

8. The adjustment assembly according to claim 6 wherein said feature comprises an eccentric collar mounted at said second connection point.

9. The adjustment assembly according to claim 1 including a retainer associated with said shield to prevent removal of said shield from the adjustment assembly while still providing a limited range of movement for said shield.

10. A method of adjusting a position of a component comprising the steps of:
(a) providing a first connection point to the component and a second connection point to the component spaced from the first connection point, wherein said first and said second connection points are connected to a common member to attach to the component and the component comprises a linkage assembly including at least a first link member and a second link member, wherein said first connection point comprises a connection between said first link member and said common member and said second connection point comprises a connection between said second link member and said common member;
(b) providing a shield having a first end coupled to the first connection point, and a second end being proximate to the second connection point and preventing access to the second connection point;
(c) loosening the first connection point to allow the shield to be selectively moved;
(d) moving the shield to allow access to the second connection point; and
(e) adjusting a position of the second connection point to achieve a desired position for the component.

11. The method according to claim 10 including re-positioning the shield to prevent access to the second connection point and tightening the first connection point subsequent to step (e).

12. The method according to claim 10 wherein the linkage assembly comprises a suspension linkage with the first link member comprising an upper control arm and the second link member comprising a lower control arm.

13. The method according to claim 10 wherein, to achieve proper adjustment of the component to the desired position, step (c) and step (d) must be performed prior to step (e).

* * * * *

UNITED STATES PATENT AND TRADEMARK OFFICE
CERTIFICATE OF CORRECTION

| | | |
|---|---|---|
| PATENT NO. | : 8,528,920 B2 | Page 1 of 1 |
| APPLICATION NO. | : 13/037423 | |
| DATED | : September 10, 2013 | |
| INVENTOR(S) | : Wittry et al. | |

It is certified that error appears in the above-identified patent and that said Letters Patent is hereby corrected as shown below:

Title Page, Item (12) "Borges, et al." should read -- Wittry, et al. --.

Title Page, Item (75) Inventor is corrected to read:
-- Christopher J. Wittry, Georgetown (KY);
Michael D. Lynch, Attica (MI);
Michael A. Power, Millbrook (AL);
Christopher S. Keeney, Troy (MI);
David G. Gonska, Beverly Hills (MI) --.

Signed and Sealed this
Fifteenth Day of September, 2015

Michelle K. Lee
*Director of the United States Patent and Trademark Office*